United States Patent [19]

Hancock

[11] Patent Number: 4,804,210
[45] Date of Patent: Feb. 14, 1989

[54] DOUBLE SEALED, DOUBLE WALL INSULATED SPA PIPE COUPLING

[76] Inventor: James W. Hancock, R.D. 2, Pusey Mill Rd., Cochranville, Pa. 19330

[21] Appl. No.: 61,375

[22] Filed: Jun. 15, 1987

[51] Int. Cl.$^4$ .............................................. F16L 59/14
[52] U.S. Cl. ........................................ 285/47; 285/53; 285/179; 285/915
[58] Field of Search .................... 285/47, 915, 179, 53

[56] References Cited

U.S. PATENT DOCUMENTS

| | | | |
|---|---|---|---|
| 2,937,662 | 5/1960 | Green | 285/47 |
| 3,152,820 | 10/1964 | Giampa et al. | 285/915 X |
| 3,402,731 | 9/1968 | Martin | 285/47 X |
| 3,801,140 | 4/1974 | Keller | 285/47 |
| 3,807,776 | 4/1974 | Bingham | 285/915 X |
| 3,848,904 | 11/1974 | Anderson | 285/915 X |
| 4,441,743 | 4/1984 | Steenberger | 285/47 X |
| 4,521,037 | 6/1985 | Knox | 285/915 X |

*Primary Examiner*—Thomas F. Callaghan
*Attorney, Agent, or Firm*—Sughrue, Mion, Zinn, Macpeak, and Seas

[57] ABSTRACT

A job site formed double sealed, double wall insulated spa pipe coupling is effected between two axially connected coupling components each having a plastic inner pipe and a concentric plastic outer pipe of considerably larger diameter with the pipes being connected by in situ foam insulation filing the space between the pipes. One component has the outer pipe and the foam insulation severed to expose the bare outer periphery of the inner pipe over a short length. The second component similarly formed includes a radially enlarged section over a short length to define a radially enlarged hub. An annular cylindrical collar of a length equal to the length of the hub is adhesively fixed on its inner periphery to the outer diameter of the outer pipe of the first component. The bare inner pipe is adhesively coated and fixed insertably into the interior of the radially enlarged inner pipe at said hub and an annular cylindrical coupler having a length equal to the combined axial length of the collar and the hub and having an inner diameter equal to the outer diameter of the collar and hub is adhesively sealed concentrically about the collar and hub to complete the double sealed pipe coupling.

3 Claims, 1 Drawing Sheet

DOUBLE SEALED, DOUBLE WALL INSULATED SPA PIPE COUPLING

FIELD OF THE INVENTION

This invention relates to plumbing for outdoor spas and hot tubs and more particularly to a double sealed, double wall insulated spa pipe coupling having a special application to such spas and hot tubs.

BACKGROUND OF THE INVENTION

Outdoor spas, hot tubs and the like require piping to carry the water circulating to and from the spa or hot tub and the heater in a circulating loop system. Typically, the pipe is formed of extruded plastic. Where the ambient temperature varies considerably and particularly where the temperature drops below freezing, it is necessary to thermally insulate the pipe within which the water circulates.

In the utilization of the thermal insulated pipes, the heat loss of the pipe to the spa support equipment is materially reduced. Further in the areas where winter weather with sustained below freezing temperature occurs, damage to the plumbing by freezing is likely, however, the utilization of insulated pipe significantly reduces the risk of such damage.

Insulated pipes have been built using a large diameter pipe concentrically surrounding a smaller diameter pipe which carries water and wherein a suitable thermal insulation fills the annular gap between the concentric pipes. Polyurethane foam constitutes one of the best insulation materials for insulating the internal pipe. It is known to foam in the insulation between the concentric, radially spaced pipes with the foam applied in situ.

The problem occurs in the assembly of sections of such insulated pipe, end to end, or the assembly on the job site of one end of the pipe to an appropriate fitting such as a an Ell.

Typically custom spa insulations were either installed without any insulation on the plumbing or a rubber type pipe insulation was employed. Subject to weather and open to the ambient, rain and ultraviolet rays of the sun deteriorate significantly the value of the insulation over a relatively short time span.

Therefore a primary object of the present invention is to provide an improved double sealed insulated spa pipe coupling between two thermally insulated double wall spa pipes as well as a coupling between one end of such thermally insulated double wall pipe and a fitting such as an Ell or the like, in which the end of the inner of two concentric plastic pipe sections may be adhesively sealed to the inner pipe or tube of the next pipe section or Ell, and adhesive coupling then effected between radially enlarged sections of the outer pipe or tube portions of either two double wall insulated spa pipes, or one end of the insulated, double wall insulated spa pipe, and an Ell.

DESCRIPTION OF THE PREFERRED EMBODIMENT

Figure 1:
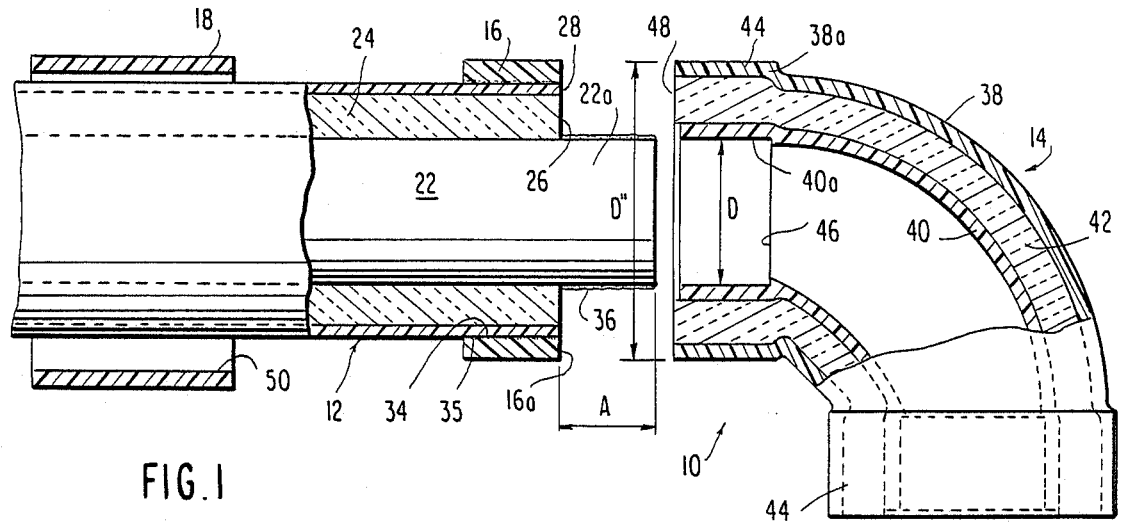
FIG. 1 is a partial section and partial side elevational, exploded view of an end of a double wall insulated spa pipe and a specially formed 90° Ell, prior to forming a double sealed coupling therebetween.

Referring to the drawings, in FIG. 1, which is an exploded view, the double wall insulated spa pipe coupling 10 is formed of two principal components, a length of pre-formed, double wall, insulated spa pipe 12 and a double wall, thermally insulated, specially formed long radius 90° Ell, indicated generally at 14.

Additionally, the coupling 10 is effected through the use of annular collar 16 and a short length, relatively large diameter coupler 18. All of the components 12, 14, 16 and 18 are preferably formed plastic, with the thermal insulation preferably of polyurethane foam.

Insofar as the double wall insulated spa pipe 12 is concerned, the spa pipe 12 is prefabricated, preferably in 10 foot lengths. A 2 inch diameter schedule 40 PVC (polyvinylchloride) inner pipe, indicated generally at 22, has a PVC spacer glued to the inner PVC pipe 22 at its midpoint. The 2 inch PVC pipe 22 and a spacer (not shown) are inserted into a 10 foot length of 4 inch DWS thin wall PVC pipe 20. A PVC centering cap (not shown) may be placed over each end of the assembled pipes 20, 22. Polyurethane foam insulation 24 is then injected, in a liquid state, into the annular space between pipes 20, 22 through one of two holes (not shown) of each centering cap (one cap at each end of the dual pipe 20, 22 assembly). To properly foam a 10 foot section of spa pipe 12, the nozzle of the foam gun should be inserted about 4 feet into the interior of the PVC outer pipe 20. As the foam liquid is injected, the nozzle is progressively withdrawn from the hole of the centering cap, within which the nozzle projects. As the liquid foaming material reacts and expands, the volume between the two pipes 20, 22 is filled with insulating foam and the two pipes 20, 22 are bonded together and suitably, thermally insulated. The foam should expand with some of the foam extending outwardly from the two holes of each centering cap. After the spa pipe 12 is filled with polyurethane foam at one end of the 10 foot length, the pipe is then injected with foam from the other end in the manner described above. The spa pipe 12, is then completely insulated over the full 10 foot length with protective end caps or centering caps on the respective ends. The centering cap may be left on the pipe during shipping. It is discarded when the spa pipe 12 is installed.

Referring to FIG. 1, to the left of the figure, coupling 10 is between one end of a 10 foot section of double wall insulated spa pipe 12 and to the right, and spaced slightly therefrom, is the specially made 90° Ell 14. On site, the installer first cuts the section of spa pipe 12, at the end, completely through the outer pipe 20 and completely through the thermal insulation 24 previously foamed in situ between the outer pipe 20 and the inner pipe 22, from the right end 12a of the spa pipe 12 to a distance A. This distance corresponds generally to the axial width or thickness of collar 44 of the 90° Ell 14. This exposes a section of the inner pipe 22. The polyurethane foam insulation 24 is completely removed so that the outer periphery of the inner pipe 22 over the short exposed length A in FIG. 1 is smooth and capable of having applied thereto the suitable adhesive cement for sealably cementing the projecting portion of the inner pipe 22 to the radially enlarged portion 40a of inner pipe 40 of Ell 14. The radial enlargement 40a within the Ell forms an annular shoulder 46 against which the end 12a of the double wall insulated spa pipe 12 abuts.

However, prior to any of this action it is necessary to slip over the end of the spa pipe 12, a short length coupler 18, having an inside diameter on the order of the diameter of collars 44, at respective ends of the Ell 14. Additionally, prior to effecting the coupling between the end of the double wall, insulated spa pipe 12, it is necessary to adhesively couple collar 16 to the outer periphery of the double wall insulated spa pipe 12 with one end 16a thereof flush with the end 26 of the polyurethane insulation 24 which has been cut back, as well, as the end 28 of the outer pipe 20. Collar 16 has an inside diameter on the order of the outside diameter of the outer pipe 20 and an outside diameter which is equal to the outside diameter of collar 44 on the Ell 14. The collar 16 is cleaned and a layer of cement 35 is applied to the inner periphery 34 of the collar. In cleaning the inner periphery of collar 16, and in cementing that collar to the outside of the outer pipe 20 adjacent the end 28 thereof, standard practices using standard cleaners and cement may be employed.

Turning next to the 2 inch inner pipe 22, the outer periphery of the exposed portion 22a that pipe is provided with a layer of adhesive 36 after cleaning the outer periphery thereof and the 2 inch pipe 22, over the length A, is cemented into the 2 inch diameter radially enlarged portion 40a of the inner pipe 40 of the 90° Ell 14.

In that respect, Ell 14 consists of an outer pipe 38, an inner pipe 40 and polyvinylchloride thermal insulation material 42 which may be foamed in situ to form the double wall, insulated spa pipe coupling Ell 14. Radial enlargements of the outer tube 38 occurs at 38a, at both ends along with like radial enlargements of inner pipe 40, at 40a, to form collars or hubs 44 at opposite ends of the Ell and to facilitate the second sealed coupling for the double sealed, double wall insulated spa pipe coupling 10 utilizing the relatively large diameter coupler 18. In making the connection at the time that the section 22a of the 2 inch inner pipe 22 is cemented to the radially enlarged portion 40a of the Ell inner pipe 40, the axial end 16a of collar 16 abuts one end of collar 44 of the oversized 90° Ell 14. Also, the polyvinylchloride insulation 24 of the double wall insulated spa pipe 12, abuts the annular edge 48 of the thermal insulation 42 (also of polyvinylchloride) of the oversized Ell 14.

It should be appreciated that the assembling and cementing of the fluid carrying inner pipe 22 to the inner pipe 40 of the oversized Ell 14 and all orientation of the units is accomplished and completed before the outside pipe 20 is sealably coupled to outside pipe 38 the oversized Ell 14. After cementing is completed between inner pipe section 22a and the radially enlarged portion 40a, of hub 44 inner pipe 40 of the Ell 14, the inner periphery 50 of the coupler 18 is thoroughly swabbed with cement at 46, FIG. 2, and/or applied simultaneously onto the outer periphery of collar 16 and the outer periphery 44a of the collar of Ell 14. Then by a rotating motion of coupler 7, it is slid over collar 16 and onto hub 44 of the 90° Ell. Thus, a second, outer sealed connection is completed for the outer pipe 20 of the double wall insulated spa pipe 12.

Figure 2:
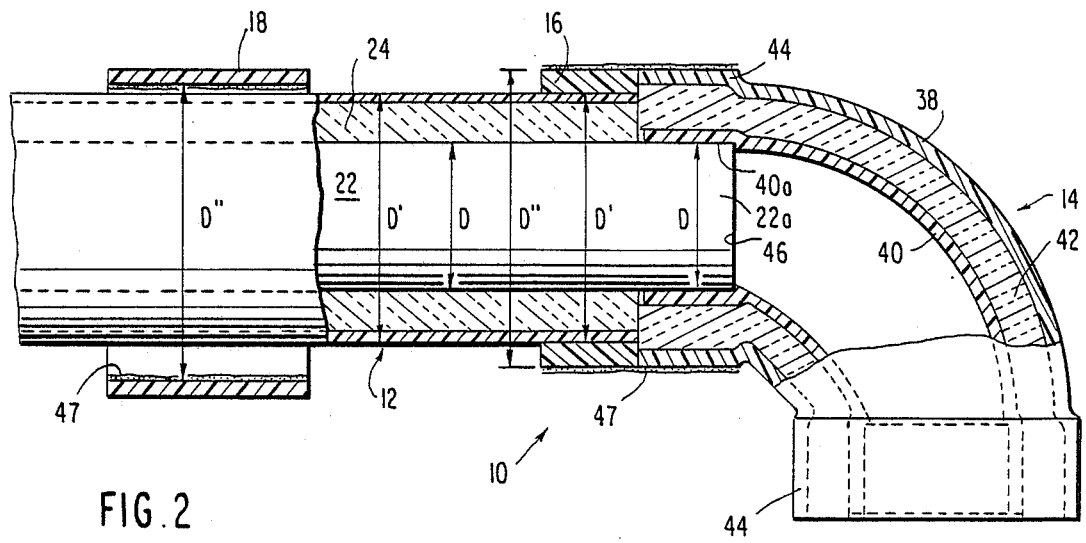
FIG. 2 is a similar partial side elevation and a partial sectional view to FIG. 1, of the coupling therebetween after completion of the connection between the inner pipe of the Ell and the inner pipe of the double wall insulated spa pipe.
Figure 3:
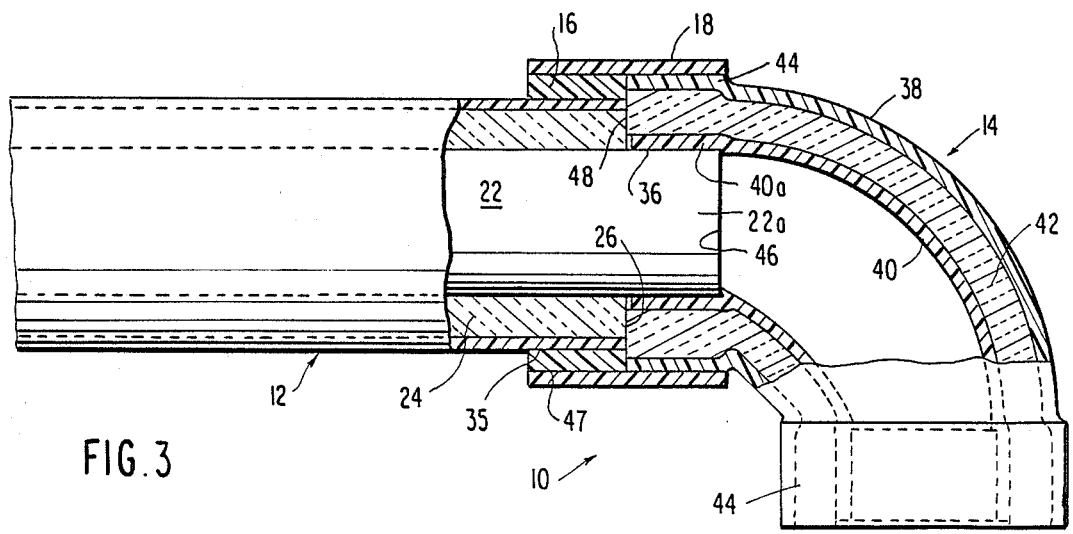
FIG. 3 is a similar side elevational view, partially in section, to those of FIGS. 1 and 2, of a completed double sealed insulated spa pipe coupling.

To effect the desired double sealed, double wall insulated spa pipe coupling 10, there are certain dimensional relationships other than the length of exposed inner pipe 22a, of FIG. 1 and the depth of radially enlarged section 40a of inner pipe 40 of the Ell 14. In FIG. 2, that relationship is detailed by the arrows showing three different diameters; the smallest of which, being the inside diameter D of inner pipe section 40a of the oversized Ell 14 which is equal to the outside diameter D of the 2 inch inner pipe 22 of the double wall insulated spa pipe 12.

The second diameter relationship is the relationship between the inside diameter D′ of collar 16 and the outside diameter D′ of the outer pipe 20 of the double walled insulated spa pipe 12.

The third diameter relationship has to do with the the outside diameter D″ of the collar 16 and which is slightly less than the inside diameter D″ of the coupler 18 and which also corresponds to the outside diameter D″ of the hub 44a at each end of Ell 14. As may be appreciated, the completion of the joint and bonding of coupler 18 to the cemented in collar 16 at the very end of the 10 foot length of spa pipe 12 and the hub 44a of Ell 14, axially abutting one end 16a of collar 16, provides a water tight joint insofar as the 4 inch diameter outer pipe 20 is concerned. Further, such a coupling or pipe joint 10 is formed of Ells and a spa pipe which are inexpensive to manufacture, may be easily installed on site with common tools and practices with the joint between the inside, small diameter plastic pipe 22 accomplished with reliable confidence to the installer that the integrity of the seal for the double walled insulated spa pipe will be effected without compromise and wherein the outer pipe 20 (outside pipe sheath) can be secured to the next length of outer pipe (or appropriate equivalent within an Ell), after the inner pipe ends are adhesively sealed and joined. Additionally, by the invention described above the outer pipes 20 can be secured to the satisfaction and complete confidence of the installer that the outside pipe will also be watertight, that the outer pipe will protect the insulation 24,42 from physical abuse and that a savings of wasted heat will fully recover to the user the cost of the foamed in insulation in a relatively short period of time.

What is claimed is:

1. A double sealed, double wall insulated spa pipe coupling comprising:
two axially connected coupling components including a first component consisting of a double wall insulated spa pipe, said double insulated spa pipe comprising a plastic inner pipe, a plastic outer pipe concentric about said inner pipe, said outer pipe having an inner diameter considerably greater than the outer diameter of said inner pipe and being spaced radially therefrom, foam insulation filling the space between said inner and outer pipes, said outer pipe and said foam insulation being severed at one end of said spa pipe over a short length thereof to expose the bare outer periphery of said inner pipe at said one end over said short length, said coupling second component consisting of a plastic inner pipe and a plastic outer pipe, said second component inner and outer pipes being concentric, said second component outer pipe being of a diameter considerably larger than the outer diameter of said second component inner pipe, foam insulation filling the space between said second component inner and outer pipes and said second component being sized similar to that said first component, said second component including at at least one end thereof, a radially enlarged section formed over a short length thereof generally equal to the length of said severed one end of said first component, and including internally in said second component inner pipe, an internal radial shoulder and a radially enlarged hub, said coupling further including, an annular cylindrical collar, said collar being of a length equal to the length of said hub, having an outer diameter equal to the outer diameter of said hub, and an inner diameter generally equal to the outer diameter of said first component outer pipe, said annular cylindrical collar being adhesively fixed to the end of said outer pipe, with an edge thereof flush to the severed end of said first component outer pipe, said first component inner pipe being adhesively joined about its outer periphery to the inner periphery of said inner pipe of said second component with said one end of said bared inner pipe of said first component in near abutment with said radial shoulder and, said spa pipe coupling further comprising an annular cylindrical coupler having an axial length equal to the combined axial length of said collar and said hub, having an inner diameter slightly larger than the outer diameter of said collar and said hub and being adhesively bonded on the inner periphery thereof, concentrically about said collar and said hub to form an outer seal therebetween complementing the inner seal formed between the adhesive coated, exposed inner pipe of said first component and said radially enlarged inner pipe of said second component, at said hub.

2. A double sealed, double wall insulated spa pipe coupling as claimed in claim 1, wherein said second component is an Ell consisting of concentric inner and outer plastic pipes, wherein said insulation is foamed in situ between said inner and outer pipes, and wherein, at opposite ends of the Ell, the radially inner and outer plastic pipes and said foamed in situ insulation is radially enlarged over a short length thereof, to form radially enlarged sections of said inner pipe and said radial shoulder at the ends of said Ell.

3. A double sealed, double wall insulated spa pipe coupling as claimed in claim 1, wherein said collar and said hub consist of plastic pipe sections of relatively short axial length and wherein said adhesive consists of an epoxy adhesive.

* * * * *